Figure 1:
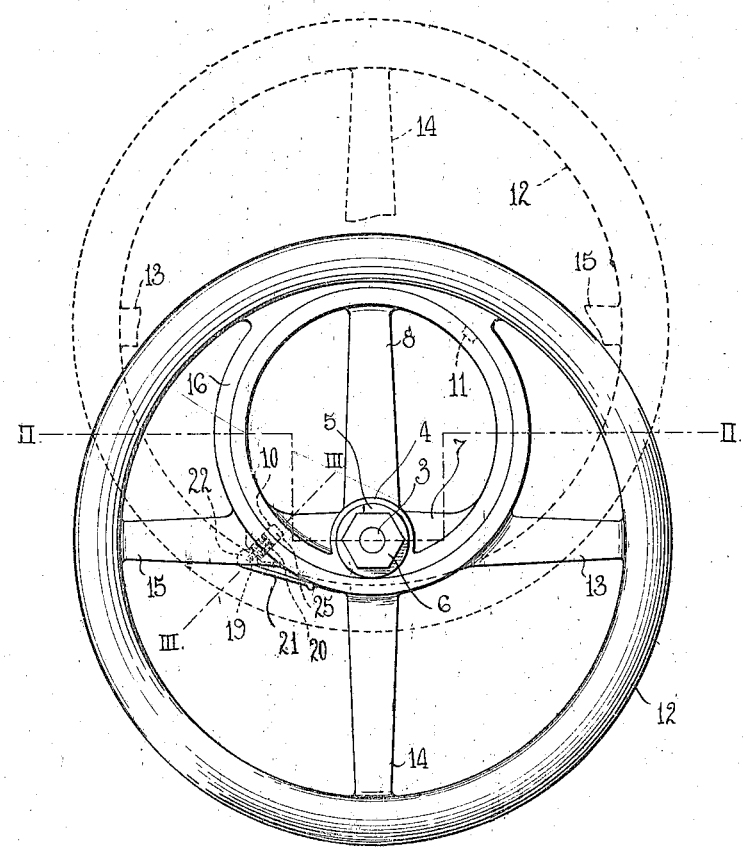

H. A. HART.
STEERING WHEEL.
APPLICATION FILED SEPT. 26, 1914.

1,143,702.

Patented June 22, 1915.

Witnesses
G. E. McIvain
Chas. W. Stauffiger

Inventor
Harry A. Hart
By
Attorneys

UNITED STATES PATENT OFFICE.

HARRY A. HART, OF DETROIT, MICHIGAN.

STEERING-WHEEL.

1,143,702.   Specification of Letters Patent.   Patented June 22, 1915.

Application filed September 26, 1914. Serial No. 863,621.

*To all whom it may concern:*

Be it known that I, HARRY A. HART, a citizen of the United States of America, residing at Detroit, in the county of Wayne and State of Michigan, have invented certain new and useful Improvements in Steering-Wheels, of which the following is a specification, reference being had therein to the accompanying drawings.

This invention relates to steering wheels especially designed for the steering post or columns of automobiles and similar motor vehicles.

The objects of my invention are, first, to provide a novel steering wheel that may be adjusted toward or from the operator of a vehicle for the purpose of giving free ingress to and egress from the vehicle; second, to furnish a steering post or column with a steering wheel that can be shifted laterally in its own plane to provide clearance at one side of the steering post or column, and third, to provide a simple, durable and inexpensive steering wheel embodying an eccentric post or column member having a rim or hand grip movable at the periphery thereof.

The above and other objects are attained by a mechanical construction that will be hereinafter specifically described and then claimed, and reference will now be had to the drawing, wherein—

Figure 2:
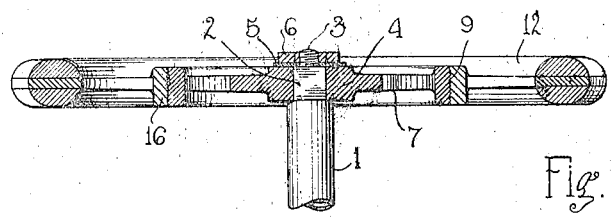
Figure 3:
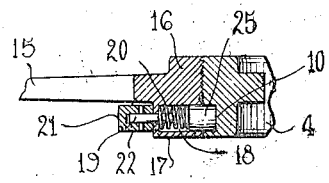

Figure 1 is a plan of the steering wheel showing the same in a shifted or offset position by dotted lines; Fig. 2 is a cross sectional view taken on the line II—II of Fig. 1; and Fig. 3 is a similar view taken on the line III—III of Fig. 1, illustrating a locking mechanism associated with the wheel.

In the drawing, the reference numeral 1 denotes a conventional form of steering post or column as having a shank 2, and an exteriorly screwthreaded stem 3.

4 denotes a steering or post member mounted upon the shank 2 and retained thereon by a washer 5 and a nut 6 or similar fastening means. The member 4 is in the form of a ring having a segment web 7 and a spoke 8, the former receiving the shank 2 of the steering post or column, whereby the member 4 will be offset or eccentrically disposed relative to the steering post or column. The periphery of the member 4 is threaded, as at 9 and provided with diametrically opposed notches 10 and 11, the purpose of which will presently appear.

12 denotes a wheel rim or hand grip provided with converging spokes 13, 14 and 15 coöperating with rim or hand grip 12 in supporting an eccentrically disposed circular member 16 adapted for locking engagement with the periphery of the member 4. The inner wall of the member 16 is screwthreaded to receive the threads of the member 4 and these threads are of a slight pitch whereby vertical movement of the member 16 relative to the member 4 is hardly perceptible when the member 16 is rotated a half revolution relative to the member 4. The threads of the member 16 meshing with the threads of the member 4 prevent the rattling of the rim or hand grip 12 and insure a positive connection with the member 4.

The spokes 13 and 15 are diametrically disposed and the spoke 14 transversely alines with the spoke 8 when the rim 12 is concentric of the steering post or column.

To lock the member 16 relative to the member 4, whereby the rim or hand grip 12 will be held in an adjusted position, the spoke 15 has the bottom side thereof provided with a boss or enlargement 17, said boss or enlargement having a recess 18 for a dog or tooth 25 adapted to engage in the notches 10 and 11 of the member 4. The dog or tooth 25 has a pin 19 extending out of the boss or enlargement 17 and said pin, within the recess 18, is encircled by a coiled compression spring 20 which holds the dog or tooth 25 normally in engagement with the member 4. The outer end of the pin 19 is pivotally connected to a cam lever 21 and the cam 22 of said lever is adapted to ride against the boss or enlargement 17 and shift the pin 19 whereby the dog or tooth 25 will be withdrawn from the periphery of the member 4. When the dog or tooth is in this position the wheel rim or hand grip 12 can be shifted to an offset or eccentric position relative to the steering post or column. It can be held in such position by the dog or tooth 25 engaging in the notch 11 of the member 4, and there is sufficient clearance for a chauffeur or operator of an automobile to easily leave or enter a seat in proximity to the steering post or column.

The elements 25 and 18 to 22 inclusive constitute means for locking the wheel rim or hand grip in adjusted position relative to the steering or post member 4, and while in the drawing there is illustrated a preferred embodiment of my invention, it is to be understood that the structural elements are susceptible to such variations and modifications as fall within the scope of the appended claims.

What I claim is:—

1. A steering wheel comprising an eccentric steering member, and a hand grip movable at the periphery thereof.

2. A steering wheel comprising an eccentric steering member, and a hand grip having a threaded connection therewith.

3. The combination with a steering post, of an eccentric member carried thereby, a circular member movable upon the periphery of said eccentric member, and a hand grip supported eccentrically of said circular member.

4. The combination with a steering post, of an eccentric steering member carried thereby, a circular member in threaded engagement with said eccentric steering member, a hand grip supported eccentrically of said circular member, and means for locking said circular member in adjusted position relative to said eccentric steering member.

5. The combination with a steering post, of a steering wheel normally concentric thereof, and an eccentric circular member carried by the inner side of said wheel, and a circular member on said post engaging said eccentric circular member whereby said wheel can be shifted to a position eccentric relative to said steering post.

6. The combination with a steering post, of a steering wheel normally concentric thereof, an eccentric circular member within the periphery of said wheel, means carried by said post in said member whereby said wheel can be shifted to a position eccentric relative to said steering post, and means carried by said steering wheel for locking said wheel in adjusted position relative to said steering post.

In testimony whereof I affix my signature in presence of two witnesses.

HARRY A. HART.

Witnesses:
GENEVIEVE E. MCGRANN,
LEWIS E. FLANDERS.